March 25, 1958

M. BROTMAN ET AL 2,828,151

SAFETY LOCK FOR VEHICLE DOORS

Filed July 18, 1955

Morton Brotman
Jack Brotman
David Diener
                INVENTORS

BY *Clarence A. O'Brien*
and *Harvey B. Jacobson*
                Attorneys

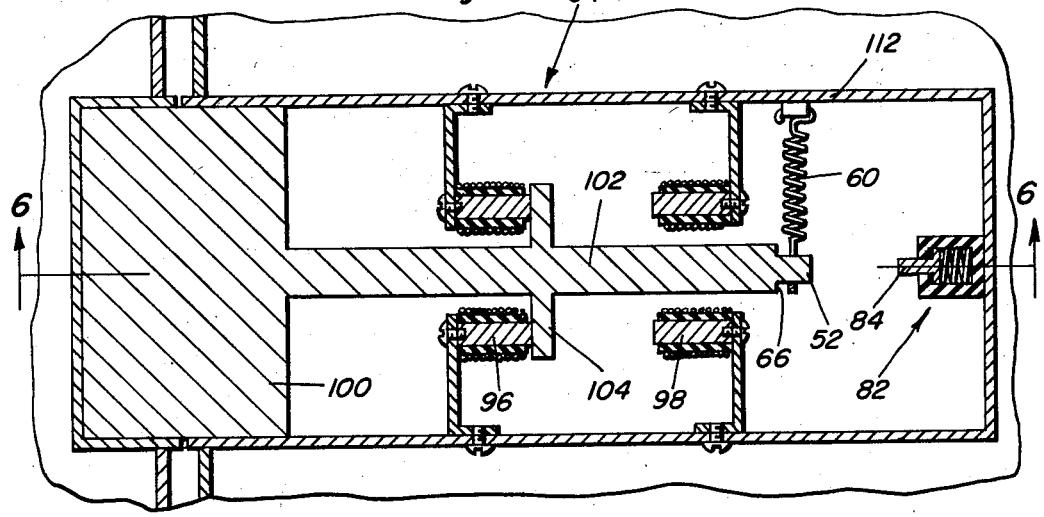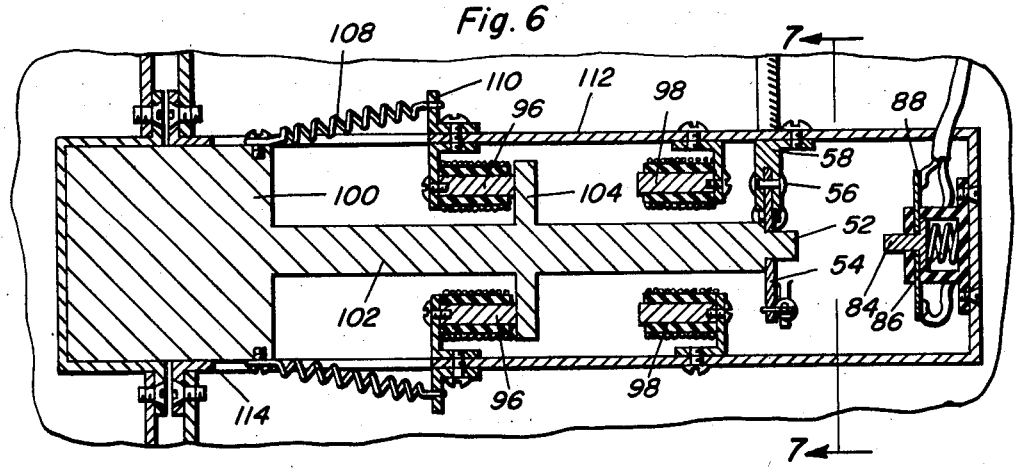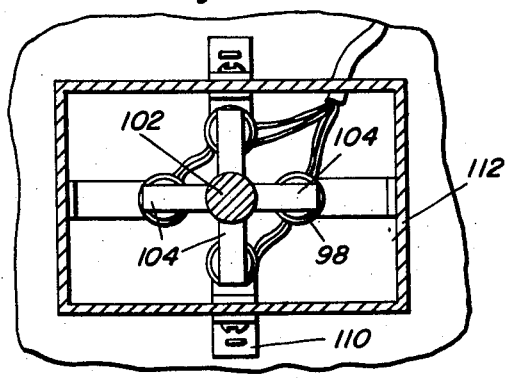

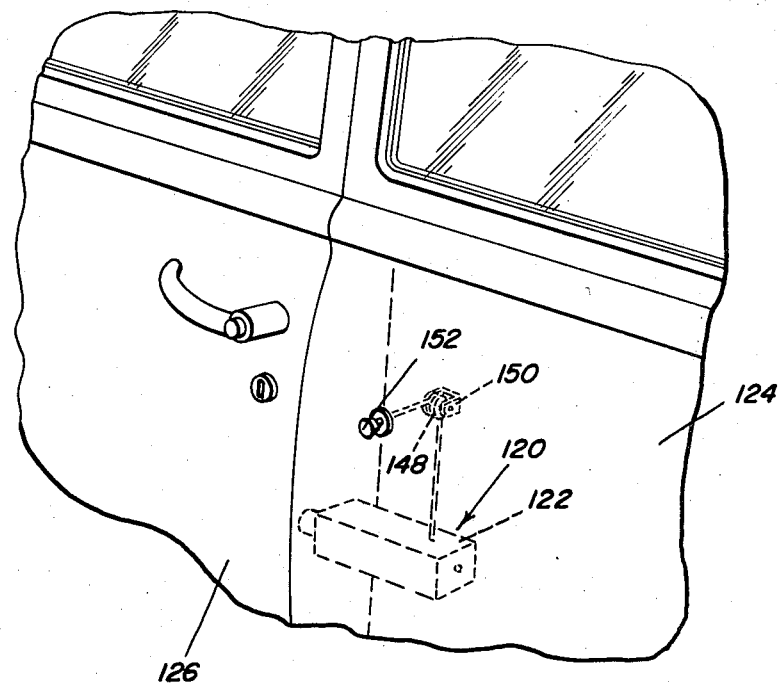
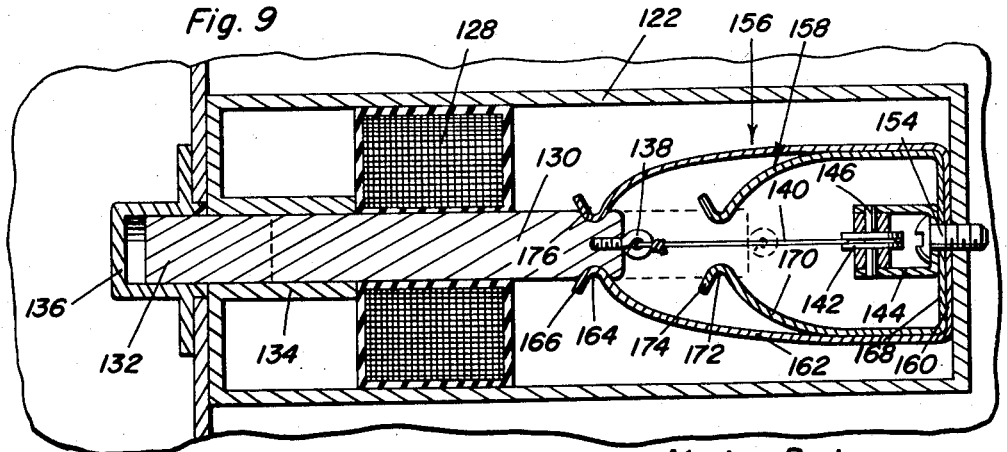
Morton Brotman
Jack Brotman
David Diene
INVENTORS

United States Patent Office 2,828,151
Patented Mar. 25, 1958

2,828,151

SAFETY LOCK FOR VEHICLE DOORS

Morton Brotman, Jack Brotman, and David Diener, Baltimore, Md.

Application July 18, 1955, Serial No. 522,533

5 Claims. (Cl. 292—144)

This invention generally relates to a safety lock for vehicle doors which is independent of any conventional lock for retaining the doors of a vehicle in closed position.

An object of the present invention is to provide a safety lock for vehicle doors which is electrically actuated from a point remote from the doors wherein a positive lock is provided for retaining the doors in closed position, thereby preventing accidental opening of the doors by children or in the case of an accident.

Another object of the present invention is to provide a safety lock for vehicle doors including a movable lock bolt mounted on a stationary part of the vehicle for movement into engagement with a keeper on the movable door together with a novel control means and locking means for retaining the lock bolt in position.

Still another important object of the present invention is to provide a safety lock which may be manually released to permit release of the locking device in the event no electrical energy is available.

Other important objects of the present invention will reside in its simplicity of construction, safety factor in operating a vehicle, ease of installation, ease of operation, indicating means for indicating the position of the lock, adaptation for its particular purposes, and its relatively inexpensive manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a longitudinal, vertical sectional view similar to Figure 2 showing a modified form of the lock device of the present invention;

Figure 6 is a longitudinal, vertical sectional view taken substantially upon a plane passing along section line 6—6 of Figure 5 illustrating the orientation of the spring members and latch construction;

Figure 7 is a transverse, vertical sectional view taken substantially upon a plane passing along section line 7—7 of Figure 6 showing the structural details of the magnetically attracted cross-arms on the movable lock bolt;

Figure 8 is a perspective view similar to Figure 1 illustrating a modified form of the present invention; and Figure 9 is a longitudinal, vertical sectional view taken substantially upon a plane passing through the longitudinal center line of the modified form of the lock as illustrated in Figure 8.

Figure 1:
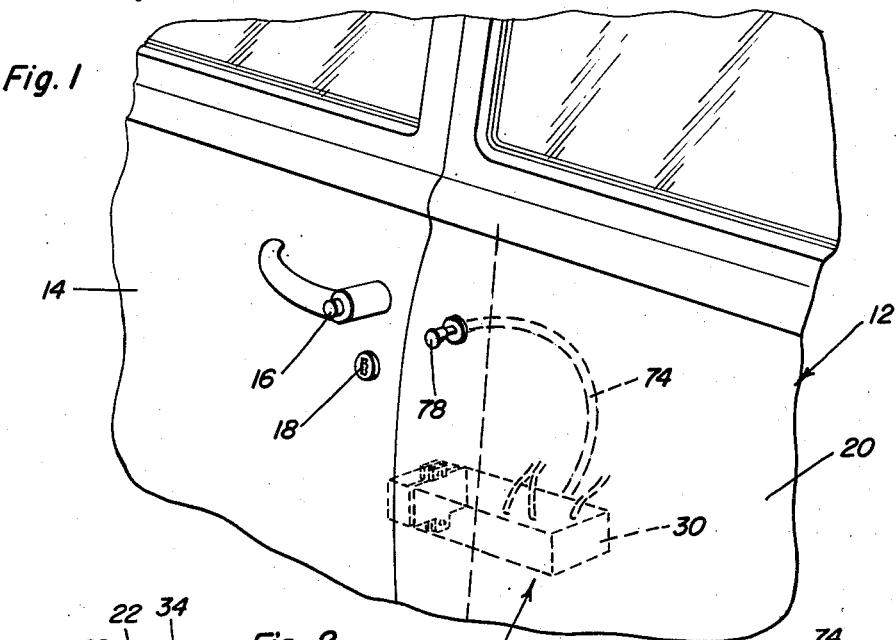
Figure 1 is a fragmentary perspective view illustrating the safety lock of the present invention installed on a vehicle.

With reference to the drawings, the numeral 10 generally designates the safety lock of the present invention for use in conjunction with vehicles generally designated by the numeral 12 which includes a pivotal door 14 in the side thereof together with a releasable latch 16 for normally retaining the door in closed position. In addition to the latch 16, a key operated lock 18 is provided for locking the door in closed position to prevent unauthorized entry into the vehicle 12. The present safety lock 10 is employed in addition to the normal lock 18 and is primarily disposed in the stationary portion 20 of the vehicle 12 which is in alignment with the door 14 when in closed position and forms an abutment post therefor.

The door 14 is provided with a vertical panel 22 forming an end wall having a generally receptacle-like keeper 24 attached in an opening 26 by the use of screw threaded fasteners 28 thereby securing the keeper 24 within the door 14 so that a knock-out blank may be provided in the opening 26 by the factory for the insertion of the keeper 24 and the safety lock 10 as an accessory that may be installed with very little alteration to the vehicle structure.

The safety lock 10 generally includes an elongated tubular housing 30 having a lock bolt 32 slidably mounted therein wherein the lock bolt 32 selectively engages within the keeper 24 for retaining the vertical wall 34 of the stationary panel 20 in alignment with the vertical wall 22 of the door 14, thereby retaining the door 14 in closed position.

The tubular casing 30 is provided with projecting attaching lugs 36 secured to the vertical wall 34 by screw threaded fasteners 38. Disposed in the casing 30 is an electromagnet 40 having a movable core 42 which forms an extension and a reduced portion of the lock bolt 32 for reciprocal movement of the lock bolt 32 when the coil 40 is energized and de-energized. The core 42 is provided with a peripheral flange 44 and a compression coil spring 46 surrounds the electromagnet 40 and is in abutting engagement at one end with the flange 44 and in abutting engagement with inwardly struck lugs 48 at its other end, thereby normally urging the core 42 and the lock bolt 32 inwardly or into a retracted position within the casing 30. The lugs 38 are also utilized to mount the electromagnet 40 by screw threaded fasteners 50.

The core 42 extends longitudinally beyond the flange 44 and terminates in a reduced end portion 52 which moves longitudinally in relation to a transversely swingable latch 54 that is pivotally mounted on a pivot pin 56 or mounting bracket 58 for pivotally supporting the latch 54. A tension spring 60 is engaged with the lower end of the latch 54 at one end thereof, and the other end is attached to a lug 62 on the casing 30. The central portion of the latch 54 is provided with a semicircular recess 64 for engagement with the reduced portion 52 of the core 42 when the core 42 is moved outwardly of the casing 30 by the action of the electromagnet 40. As the core 42 moves longitudinally in an outward direction, the spring 60 urges the latch 54 into engagement with the reduced end 52 and behind the shoulder 66 formed at the junction of the reduced portion 52 with the core 42, thereby retaining the lock bolt 32 in extended or locked position, even after the electromagnet 40 is de-energized.

The particular construction of the lugs on the bracket 58 and the relationship of the pivot pin 56 prevent tilting or canting of the latch 54, thereby forming substantially a rigid latch. An electromagnetic coil 68 is mounted on a bracket 70 within the casing 30 and connected by suitable electric wires 72 for withdrawing the latch 54 from engagement with the reduced portion 52 of the core 42 against the tension of the spring 60 for releasing the lock bolt 32 to permit the spring 46 to move the core 42 and the lock bolt 32 to a retracted and inoperative position.

In the event electrical energy is not available for releasing the latch 54, a Bowden cable 74 is provided with an abutment member 76 on the inner end thereof for engagement with the latch 54 and an operating button 78 on the outer end thereof for movement wherein the abutment 76 may be engaged against the latch 54 for moving the latch 54 out of engagement with the reduced end portion 52 and the shoulder 66, thereby permitting the locking bolt 32 to be retracted by the spring 46.

A signal light 80 may be mounted on the dashboard and provided with a switch 82 actuated by the reduced end 52 of the core 42 wherein the indicator light 80 will be illuminated when the lock bolt 32 is in locked position and will be off when the lock bolt 32 is in unlocked position. This switch 82 generally includes a movable button 84 which is spring loaded by spring 86 wherein the button 84 is in the path of movement of the reduced end 52 for inward movement when the lock bolt 32 is in unlocked position, thereby breaking the circuit between the conductors 88. Also, a suitable switch 90 may be provided for the electromagnet 40, and a switch 92 may be provided for the electromagnetic coil 68 for manipulation thereof, and the switches may be supported on the instrument dash panel of a vehicle or any other suitable position.

Figure 2:
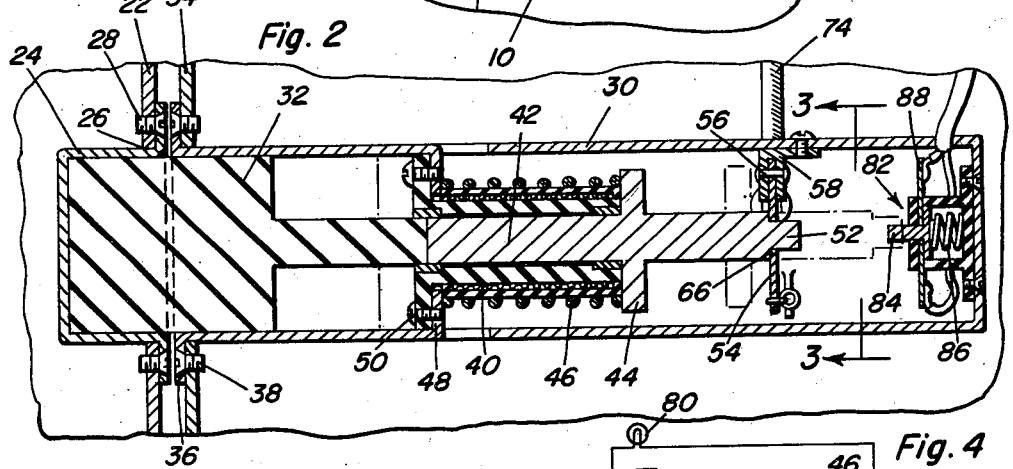
Figure 2 is a longitudinal, vertical sectional view taken substantially upon a plane passing through the longitudinal center line of the safety lock of the present invention.
Figure 4:
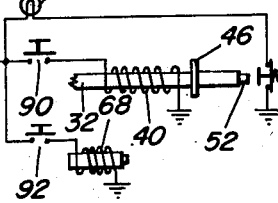
Figure 4 is a schematic lay-out of the electrical circuit utilized in the safety lock of the present invention.
Figure 3:
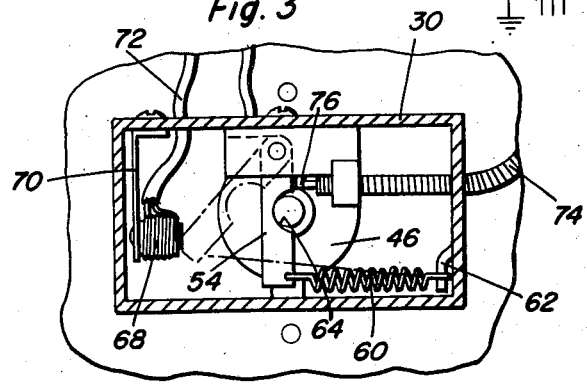
Figure 3 is a transverse, vertical sectional view taken substantially upon a plane passing along section line 3—3 of Figure 2 illustrating structural details of the locking mechanism.

Referring now specifically to Figures 5–7, the numeral 94 generally designates a modified form of the present invention which includes a similar construction except for the elimination of the electromagnet and the provision of attracting and repelling electromagnet coils. The attracting coils are designated by the numeral 96 and the repelling coils are designated by the numeral 98, and the lock bolt 100 having the arm 102 extending therefrom is provided with four radially extending arms 104 which move between the magnetic coils 96 and 98, and when these coils are energized, the pulling coils 96 will urge the lock bolt 100 into locked position and the repelling coils 98 will assist the pulling coils 96. The end of the arm 102 is exactly the same as that described in relation to Figures 2 and 3, and the switch mechanism is also identical for indicating the position of the lock bolt 100.

A pair of tension spring members 108 are provided between the lock bolt 100 and projecting lugs 110 on the casing 112 wherein the casing 112 is provided with slots 114 for the actuation of the springs 108 wherein the springs 108 will automatically retract the lock bolt 100 when the latching means 54 is released.

It will be seen that in each instance, electrical energy is only necessary for the movement of the lock bolt to locked position wherein a latch is then utilized to hold the device in locked position. When the latch is to be released, an electromagnetic coil is utilized for releasing the same wherein spring tension moves the lock bolt to its retracted position and the indicating light indicates the position of the lock bolt at all times. The latch mechanism is provided with a safety device in the event no electrical energy is available.

As specifically illustrated in Figures 8 and 9, the numeral 120 illustrates a simplified form of the present invention including a generally tubular housing 122 secured within a stationary part 124 of a vehicle for retaining the door 126 in closed position. Disposed within the housing 122 is a reversible electromagnetic coil 128 having an elongated core 130 movable therethrough. The core 130 is provided with an extension 132 which forms a locking bolt and is slidably received in a sleeve 134 integrally formed with the housing 122. The lock bolt 132 is adapted for selectively engaging a keeper 136 mounted in the door 126 wherein the lock bolt 132 will selectively retain the door 126 in closed position.

A screw threaded eye member 138 is secured in the end of the core 130 remote from the keeper portion 132 and is connected to a flexible line 140 which is passed over a pulley 142 mounted on a supporting bracket 144 of generally U-shaped construction with the pulley shaft 146 extending through the leg portions thereof. The flexible arm 140 then continues upwardly over another pulley 148 mounted on a bracket 150 mounted above the casing 122 wherein the flexible line 140 is connected to a pull button 152 mounted exteriorly of the stationary portion 124 of the vehicle body, thereby permitting manual release of the locking bolt 132 by retracting the core 130 without the use of electrical energy.

Securing the U-shaped bracket 144 to the housing 122 is a securing fastening bolt 154 which also passes through two U-shaped spring members generally designated by the numerals 156 and 158, respectively. The spring 156 includes a bight portion 160 and a pair of elongated legs 162 terminating in inwardly projecting rounded portions 164 together with outwardly flared end portions 166. The spring member 158 is provided with a bight portion 168 together with a pair of legs 170 terminating in a rounded inwardly extending portion 172 together with outwardly flared ends 174 wherein the rounded portions 164 and 172 of the springs 158 and 156 respectively are in longitudinal alignment for receiving and engaging peripheral or diametrically opposed recesses 176 in the core 130, thereby resiliently and frictionally retaining the core 130 in a retracted or extended position.

In operation, the reversible electromagnetic coil 128 may be energized for forcing the core 130 in either direction, wherein the core may be extended for extending the locking bolt 132 into engagement with the keeper 136 or may be retracted for retracting the locking bolt 132 from the keeper 136. When the core 130 is extended, the U-shaped spring member 156 engages the core 130 for retaining it in position without the necessity for the electrical energy to be continuously supplied to the electromagnet 128. When the core 130 is retracted, the spring member 158 will frictionally and resiliently engage the core 130, thereby retaining it in retracted position without the continuous application of electrical energy to the electromagnet 128.

The electromagnet 128 will be sufficient in strength to overcome the frictional resistance of the springs 156 and 158, thereby permitting the core 130 to be moved longitudinally thereby. The mechanical hand knob 152 may be provided for releasing the device in the event electrical energy is not available, and suitable control switches and indicating lights may be provided in this particular device as well as in the other forms of the invention illustrated herein.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A lock device for openable doors comprising a movable lock bolt for direct engagement with a keeper, a single electrically actuated means for moving said lock bolt to a locked and unlocked position, and resilient frictional means for retaining said bolt in both positions, said frictional means comprising a pair of U-shaped spring members, one of said spring members having legs extending beyond the legs of the other spring member, each pair of legs terminating in inwardly extending rounded end portions, said lock bolt having a recess therein for receiving the rounded end of the spring members.

2. A door lock for a vehicle door comprising a supporting member adapted to be mounted on a vehicle door, a stationary solenoid coil supported from said supporting member, a movable core in said coil with the ends of the core extending beyond the coil, one end of said core adapted to extend beyond the supporting member for engagement with a stationary keeper on the vehicle for selectively locking the door in closed position, spring means coaxial with the other end of the core for retracting the core when the coil is de-energized thereby disengaging the one end of the core from the keeper, the one end of said core being constructed of non-magnetic material to permit the one end of the core to be moved outwardly of the coil into contact with the keeper when the coil is energized and the core centralized therein for locking the door.

3. The combination of claim 2 wherein said core is provided with abutments for limiting the scope of movement thereof when being retracted and extended, said spring means engaging the abutment on said other end of the core.

4. A door lock for a pivotal door comprising supporting bracket means for mounting the lock upon a door, a stationary solenoid coil supported by said bracket means, a composite core mounted in said coil for longitudinal movement with the core extending from opposite ends of the coil, one projecting end of the core being of non-magnetic material whereby energization of the coil will centralize the remainder of the core therein thereby moving the core for extending the non-magnetic end into locking engagement with a stationary keeper on a door frame, an abutment at each end of the core for limiting the longitudinal movement thereof, spring means disposed coaxially with the core with one end thereof engaging the abutment adjacent the other end of the core for resiliently retracting the core when the coil is deenergized, and means frictionally retaining the core in retracted position with a longitudinal force exerted on the core by the coil capable of overcoming the holding action of the retaining means for extending the core.

5. The combination of claim 4 wherein the abutment on the core remote from the non-magnetic end is in the form of a peripheral flange, said spring means being in the form of a compression coil spring having one end engaged with said flange for urging the core to retracted position.

References Cited in the file of this patent

UNITED STATES PATENTS

| 376,121 | Tucker | Jan. 10, 1888 |
| 632,868 | Francis | Sept. 12, 1888 |
| 1,958,940 | Cavanaugh et al. | May 15, 1934 |
| 2,276,019 | Ching | Mar. 10, 1942 |
| 2,499,727 | Craig | Mar. 7, 1950 |
| 2,510,201 | Summey | June 6, 1950 |
| 2,673,108 | Roller | Mar. 23, 1954 |
| 2,714,521 | Graham | Aug. 2, 1955 |